(12) United States Patent
Shih

(10) Patent No.: US 9,145,911 B2
(45) Date of Patent: Sep. 29, 2015

(54) ANTI-SPLIT WOOD SCREW

(71) Applicant: BI-MIRTH CORP., Kaohsiung (TW)

(72) Inventor: Sheng-Tsai Shih, Kaohsiung (TW)

(73) Assignee: BI-MIRTH CORP., Kaohsiung (TW)

( * ) Notice: Subject to any disclaimer, the term of this patent is extended or adjusted under 35 U.S.C. 154(b) by 65 days.

(21) Appl. No.: 13/967,567

(22) Filed: Aug. 15, 2013

(65) Prior Publication Data

US 2015/0050101 A1   Feb. 19, 2015

(51) Int. Cl.
*F16B 25/00* (2006.01)
*F16B 35/00* (2006.01)

(52) U.S. Cl.
CPC ....................... *F16B 35/00* (2013.01)

(58) Field of Classification Search
CPC ................................ F16B 25/00; F16B 35/00
USPC ........................................................ 411/386
See application file for complete search history.

(56) References Cited

U.S. PATENT DOCUMENTS

| | | | | |
|---|---|---|---|---|
| 4,241,638 | A * | 12/1980 | Shimizu et al. | 411/386 |
| 8,360,702 | B2 * | 1/2013 | Yu | 411/386 |
| 2007/0269287 | A1 * | 11/2007 | Runge et al. | 411/378 |
| 2009/0110512 | A1 * | 4/2009 | Chen | 411/386 |

* cited by examiner

*Primary Examiner* — Roberta Delisle
(74) *Attorney, Agent, or Firm* — Muncy, Geissler, Olds & Lowe, P.C.

(57) ABSTRACT

An anti-split wood screw includes a screw head and a shank. The shank has a tip portion connected to a distal end thereof, a first thread extended helically from the front end of the tip portion toward the distal end of the shank, a second thread extended helically from the distal end of the first thread toward the shank, and a third thread extended helically from the distal end of the second thread toward the middle of the shank. The second thread has a plurality of serrated cutting edges and teeth peaks that are alternately disposed. The anti-split wood screw thus formed can tap an object through the first thread, cut off the chips generated during tapping through the second thread, and channel out the chips through the third thread without being clogged by the chips, hence can avoid the object from splitting and damaging.

8 Claims, 4 Drawing Sheets

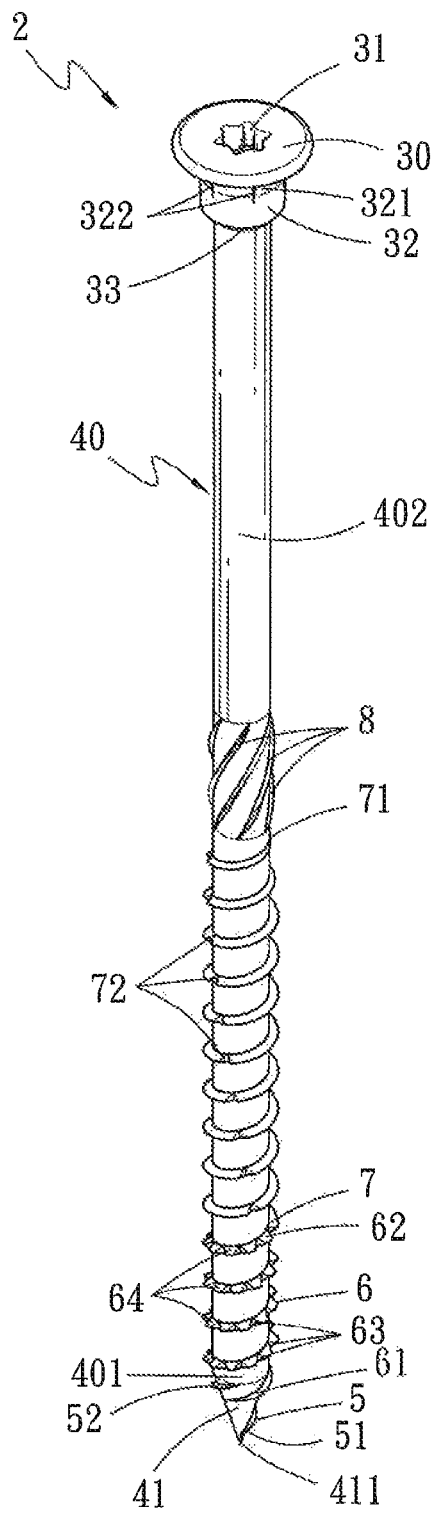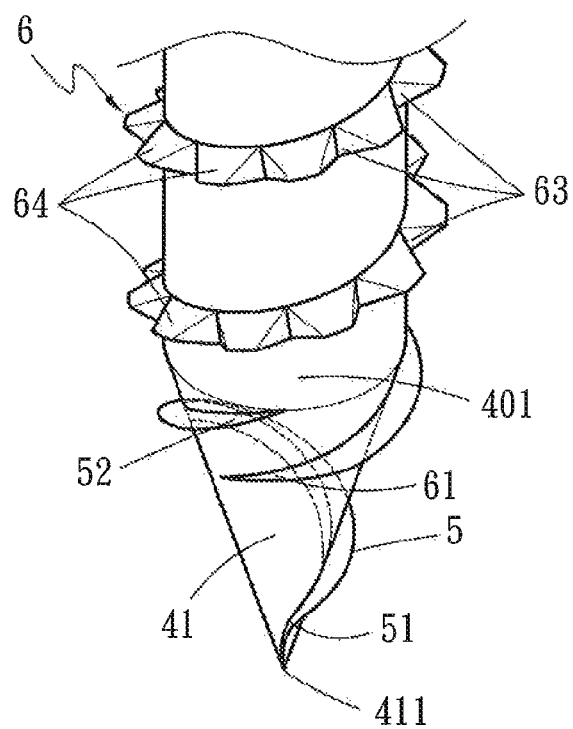
Fig. 2A
Fig. 2B

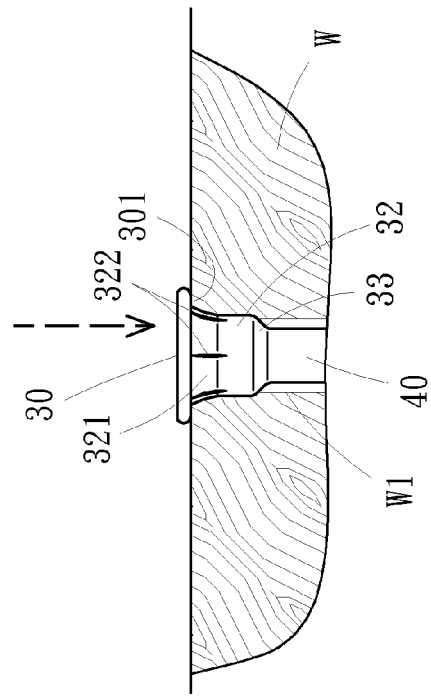
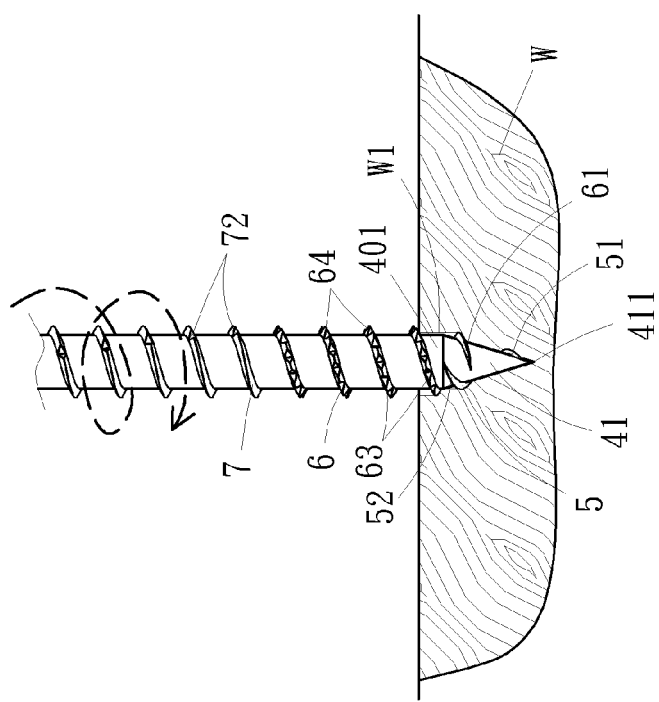

ANTI-SPLIT WOOD SCREW

FIELD OF THE INVENTION

The present invention relates to a screw and particularly to a wood screw for tapping and fastening objects.

BACKGROUND OF THE INVENTION

To fasten an object W such as furniture or wooden articles, referring to FIG. 1A and FIG. 1B, a screw 1 with a tip portion 11 at the distal end is commonly used. As the object W usually does not have a hole formed by drilling in advance, the tip portion 11 has to be screwed into the object W by force during tapping of the screw 1; meanwhile, chips are generated by means of threads 12 of the screw 1 and then channeled out reversely along the threads 12. While the threads 12 are wedged in a screw hole W1 of the object W during tapping, the chips easily clogs the threads 12 to generate frictional resistance. Hence fastening the screw 1 requires a greater effort, and the screw hole W1 tends to be squeezed to generate cracks C1 to result in damage of the object W. This weakens the strength of the object W and reduces the durability thereof. It also spoils the appearance of the object W. Moreover, after the screw head 13 of the screw 1 is wedged in the screw hole W1, the screw hole W1 also is squeezed by the screw head 13 to create other cracks C2.

SUMMARY OF THE INVENTION

In view of the aforesaid concerns, the primary object of the present invention is to provide an anti-split wood screw fastened to a wooden object without causing cracks thereof.

To achieve the foregoing object, the anti-split wood screw of the invention includes a screw head and a shank. The screw head has a neck extended from a lower side thereof. The neck has a first guiding portion tapered downwards from the bottom end thereof. The shank is connected to a lower side of the first guiding portion, and has a tip portion connected to a distal end of the shank, a first thread helically formed on the periphery of the tip portion for one circle and including a first end connected to the front end of the tip portion and a second end connected to the distal end of the shank, a second thread including a third end between the first and second ends and extended helically from the third end toward the shank for multiple circles, and a third thread connected to and extended helically from a fourth end of the second thread toward the middle of the shank for multiple circles. The first end of the first thread is tapered gradually toward the front end of the tip portion. The third end of the second thread is also tapered gradually toward the front end of the tip portion. The second thread has a plurality of serrated cutting edges and a plurality of teeth peaks that are alternately disposed.

The wood screw of the invention thus formed provides many advantages, notably:

1. The anti-split wood screw can tap a wooden object through the first thread and cut off the chips generated during tapping through the second thread to prevent the chips from accumulating and clogging the screw hole formed in the wooden object, thereby does not cause cracks or damage the wooden object.

2. The chips can be channeled out through the third thread so that the wood screw can be screwed into the wooden object with less effort. The screw head is wedged in the wooden object for fastening through the first guiding portion without cracking the wooden object caused by abrupt expansion of the hole by the neck of the screw head. The screw head also provides greater wrench strength without being deformed by the torsional force while the screw is screwed into the wooden object.

3. The screw head of the anti-split wood screw can form a close contact with the surface of the wooded object without jutting outwards, thus can avoid users from hitting and prevent injury accidents.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2A is a perspective view of the anti-split wood screw of the invention.

FIG. 2B is a fragmentary enlarged view of the tip portion according to FIG. 2A.

FIG. 4A is a schematic view of the anti-split wood screw of the invention in a condition of tapping a wooden object.

FIG. 4B is another schematic view of the anti-split wood screw of the invention in a condition of tapping a wooden object.

DETAILED DESCRIPTION OF THE PREFERRED EMBODIMENT

Figure 1B:
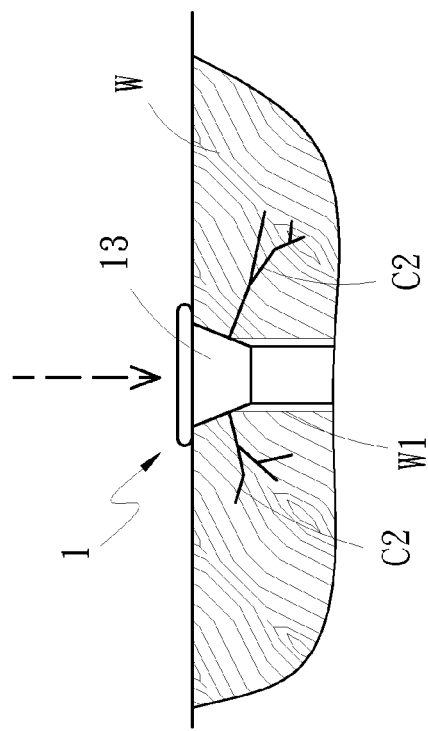
FIG. 1B is another schematic view of a conventional screw in a condition of tapping an object.
Figure 1A:
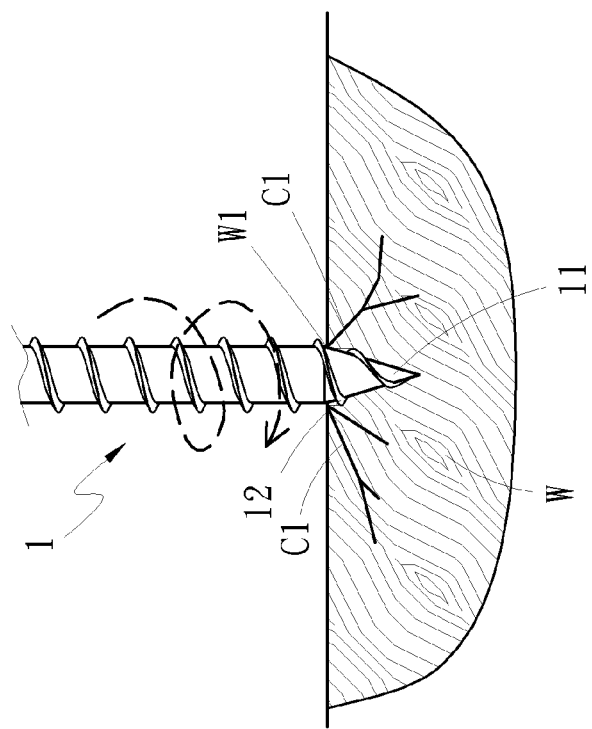
FIG. 1A is a schematic view of a conventional screw in a condition of tapping an object.
Figure 3:
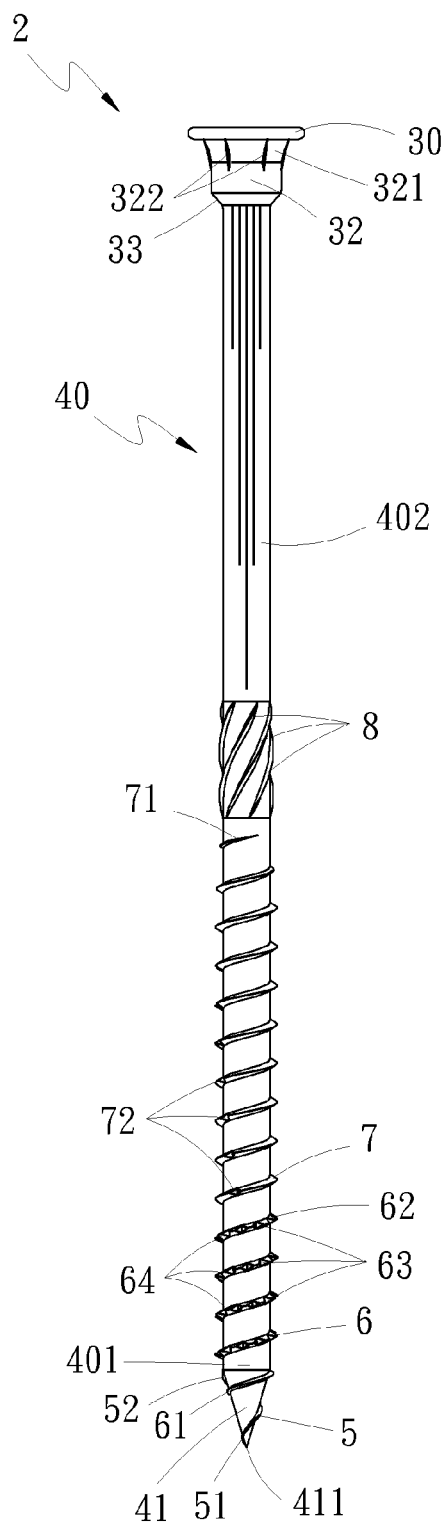
FIG. 3 is a front view of the anti-split wood screw of the invention.

Please refer to FIGS. 2A through 4B, the present invention aims to provide an anti-split wood screw 2 which comprises a screw head 30 and a cylindrical shank 40.

The screw head 30 has a wrench cavity 31 at the top end thereof twistable by a wrench tool (not shown in the drawings) such as a screw driver or other screw matching tools for wrenching. The screw head 30 has a neck 32 extended from a lower side thereof. The neck 32 has a first guiding portion 33 tapered downwards from the bottom end thereof to form a sloped surface and a second guiding portion 321 tapered towards the first guiding portion 33 to form an arched surface. The second guiding portion 321 has a plurality of jutting ribs 322 formed on the periphery thereof.

The shank 40 is connected to a lower side of the first guiding portion 33. The shank 40 has a tip portion 41 connected to a distal end 401 thereof, a first thread 5 helically formed on the periphery of the tip portion 41 for one circle and including a first end 51 connected to the front end 411 of the tip portion 41 and a second end 52 connected to the distal end 401 of the shank 40, and a second thread 6 including a third end 61 between the first end 51 and the second end 52 and extended helically from the third end 61 toward the shank 40 for multiple circles. The first end 51 of the first thread 5 is tapered gradually toward the front end 411 of the tip portion 41. The third end 61 of the second thread 6 is also tapered gradually toward the front end 411 of the tip portion 41. The second thread 6 and the first thread 5 are formed in a same helical direction, and the second thread 6 further has a plurality of serrated cutting edges 63 and a plurality of teeth peaks 64 that are alternately disposed. The shank 40 further has a third thread 7 connected to and extended helically from a fourth end 62 of the second thread 6 toward the middle of the shank 40 for multiple circles. The third thread 7 and the second thread 6 are formed in a same helical direction. The shank 40 also has a plurality of diagonal threads 8 at a fifth end 71 of the third thread 7 and formed in a same direction as the third thread 7. The third thread 7 has indented helical cutting edges 72. The helical cutting edge 72 and the third thread 7 are formed in reverse helical directions. The shank 40 also has a smooth surface 402 between the diagonal threads 8 and the first guiding portion 33.

By means of the structure set forth above, when the anti-split wood screw 2 is used on a wooden object W, it is tapped into the wooden object W via a wrench tool to generate a screw hole W1 on the wooden object W through the first thread 5; then the second thread 6 is accordingly screwed into the wooden object W and the chips are generated and held between the second end 52 of the first thread 5 and third end 61 of the second thread 6, hence resistance of the chips can be reduced and the chips can be channeled at greater efficacy. Moreover, the serrated cutting edges 63 and teeth peaks 64 of the second thread 6 and helical cutting edge 72 of the third thread 7 can quickly cut off the fiber structure of the wooden object W, and the generated chips can be channeled out through the third thread 7, while the diagonal threads 8 can engage with the wooden object W to prevent the anti-split wood screw 2 from loosening off. Finally, the neck 32 of the screw head 30 can be guided and wedged in the screw hole W1 through the sloped surface of the first guiding portion 33, and the inner side 301 of the screw head 30 also can be in close contact with the surface of the wooden object W through guiding of the second guiding portion 321.

As a conclusion, during tapping of the anti-split wood screw 2, the chips are less likely to be accumulated and clogged in the wooden object W, so that cracking of the wooden object W can be avoided and screw fastening also can be accomplished quickly with less effort. Moreover, the neck 32 of the screw head 30 can be wedged in the screw hole W1 for fastening through guiding of the first and second guiding portions 33 and 321, therefore cracking of the screw hole W1 due to expansion caused by abrupt wedging of the neck 32 also can be averted. Furthermore, the jutting ribs 322 can reinforce the fastening between the wood screw 2 and the wooden object W, and the screw head 30 has greater wrench strength to prevent deformation thereof caused by too much torsional force during tapping of the wood screw 2 into the wooden object W. Finally, the screw head 30 also can form close contact with the surface of the wooden object W without jutting outside to avoid users from hitting and prevent accidental injury.

In short, the anti-split wood screw of the invention can eliminate the shortcomings of the conventional wood screws and provide significant improvement in practicality and usability.

What is claimed is:

1. An anti-split wood screw, comprising:
a screw head including a neck extended from a lower side thereof, the neck including a first guiding portion tapered downward from a bottom end thereof; and
a shank which is connected to a lower side of the first guiding portion and includes a tip portion connected to a distal end of the shank, a first thread helically formed on the periphery of the tip portion for one circle and including a first end connected to the front end of the tip portion and a second end connected to the distal end of the shank, a second thread including a third end between the first end and the second end and extended helically from the third end toward the shank for multiple circles, and a third thread connected to and extended helically from a fourth end of the second thread toward the middle of the shank for multiple circles;
wherein the first end of the first thread is tapered gradually toward the front end of the tip portion; and
wherein the third end of the second thread is tapered gradually toward the front end of the tip portion, and the second thread includes a plurality of serrated cutting edges and a plurality of teeth peaks which are alternately disposed;
wherein the third thread includes an indented helical cutting edge, and
wherein the third thread and the helical cutting are formed in reverse helical directions.

2. The anti-split wood screw of claim 1, wherein the first thread and the second thread are formed in a same helical direction, and the second thread and the third thread are formed in a same helical direction.

3. The anti-split wood screw of claim 1, wherein the third thread includes a fifth end and the shank includes a plurality of diagonal threads at the fifth end.

4. The anti-split wood screw of claim 3, wherein the shank is cylindrical and includes a smooth surface between the diagonal threads and the first guiding portion.

5. The anti-split wood screw of claim 3, wherein the diagonal threads and the third thread are formed in a same helical direction.

6. The anti-split wood screw of claim 1, wherein the neck of the screw head includes a second guiding portion tapered towards the first guiding portion.

7. The anti-split wood screw of claim 6, wherein the second guiding portion includes a plurality of jutting ribs on the periphery thereof.

8. The anti-split wood screw of claim 1, wherein the screw head includes a wrench cavity on the top end thereof twistable by a wrench tool for wrenching.

* * * * *